US006747997B1

(12) United States Patent
Susnow et al.

(10) Patent No.: US 6,747,997 B1
(45) Date of Patent: Jun. 8, 2004

(54) NETWORK CHANNEL RECEIVER ARCHITECTURE

(75) Inventors: Dean S. Susnow, Portland, OR (US); Richard D. Reohr, Jr., Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 827 days.

(21) Appl. No.: 09/592,672

(22) Filed: Jun. 13, 2000

(51) Int. Cl.[7] .................................................. H04J 3/06
(52) U.S. Cl. ....................... 370/509; 370/503; 370/506; 713/500; 375/372
(58) Field of Search ............................... 370/503, 505, 370/506, 516, 517; 713/500; 710/305; 375/372

(56) References Cited

U.S. PATENT DOCUMENTS 6,055,285 A * 4/2000 Alston .......................... 375/372
6,289,066 B1 * 9/2001 LaVigne et al. ............. 375/372
6,425,034 B1 * 7/2002 Steinmetz et al. .......... 710/305

* cited by examiner

*Primary Examiner*—Douglas Olms
*Assistant Examiner*—Robert W. Wilson
(74) *Attorney, Agent, or Firm*—Kenyon & Kenyon

(57) ABSTRACT

A network interface controller connects a processing system to receive data from a network fabric through a serial link. The data on the link is clocked in a link clock domain that is different than the core clock domain of the network interface controller. A physical interface operates in the link clock domain. It has a pipeline architecture partitioned into an input register block, a decoder block and a link synchronization manager. The input register block receives the link clock and the data on the link, and transfers the data into the link clock domain. The decoder block has dual cascaded 8B/10B decoders receiving and decoding the data transferred by the input register block. The link synchronization manager manages the synchronization of the serial link according to the decoded data. An elastic buffer is connected to the output of the link synchronization manager. It is configured to output the decoded data in the core clock domain.

16 Claims, 7 Drawing Sheets

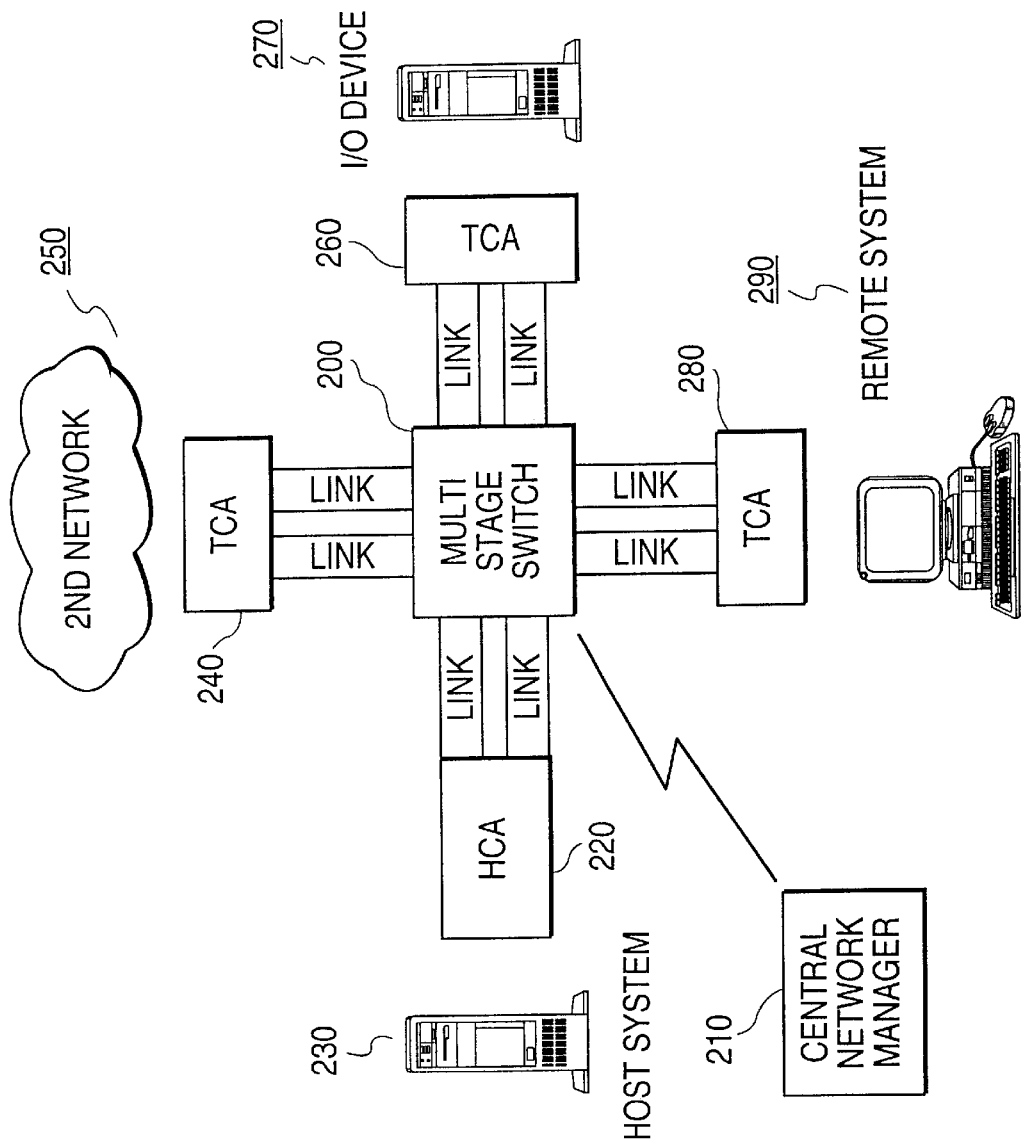

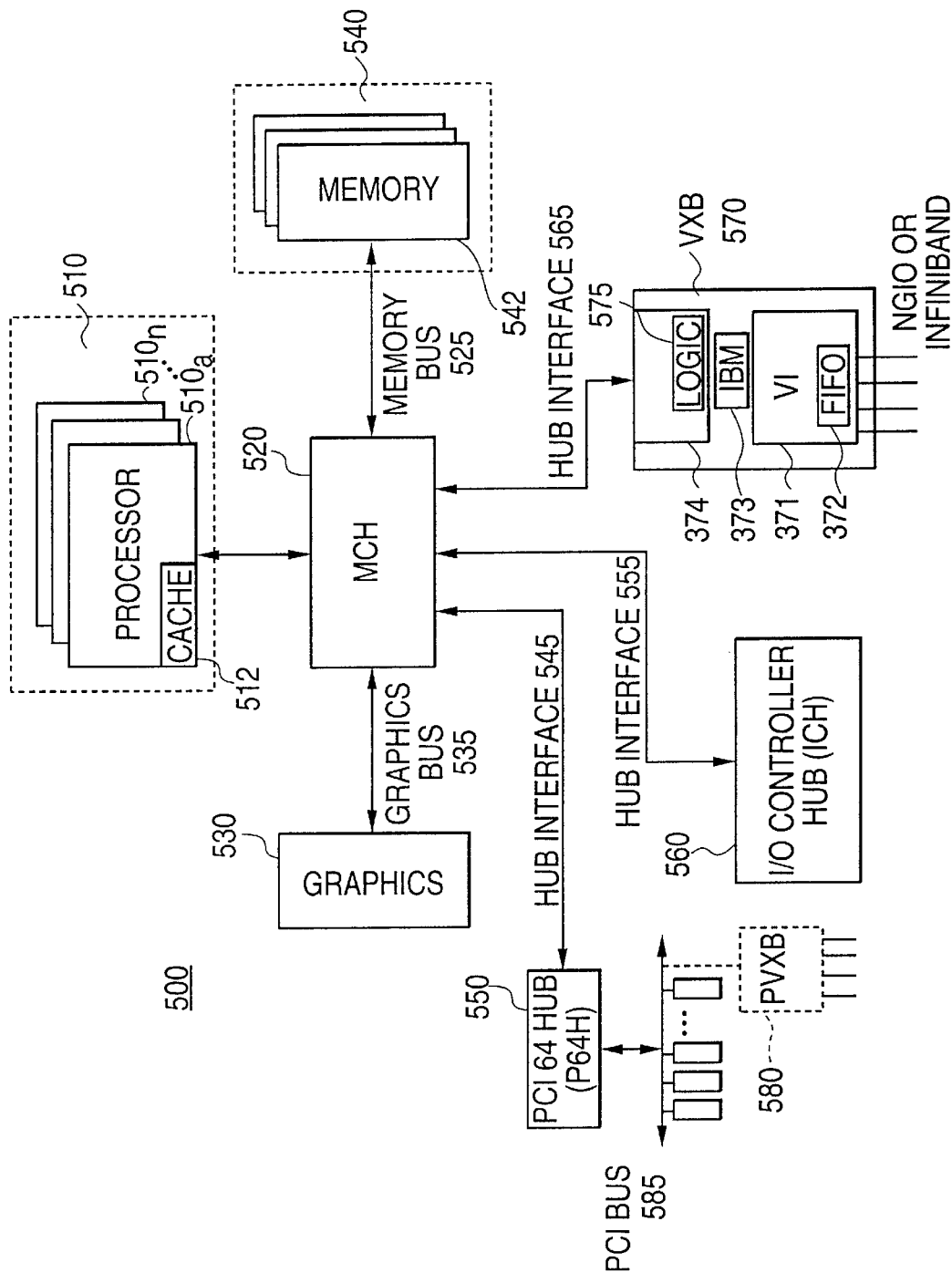

NETWORK CHANNEL RECEIVER ARCHITECTURE

BACKGROUND

1. Field of the Invention

This invention relates generally to the transfer of data over a network. In particular, the present invention relates to the architecture of a network interface controller for a channel-based, switched fabric network.

2. Description of the Related Art

It has been suggested that some networks would benefit from having a channel oriented, switched fabric, serial link architecture designed to meet the growing needs of I/O reliability, scalability and performance on commercial high-volume servers. Next Generation I/O and Infiniband networks use an efficient engine that is coupled to host memory to replace shared buses with a fabric of switchable point-to-point links. This approach decouples the CPU from the I/O subsystem and addresses the problems of reliability, scalability, modular packaging, performance and complexity. Communication between CPU and peripherals occurs asynchronously with the I/O channel engine. The I/O channel engine is utilized to transport data to and from main memory and allow the system bus to act as a switch with point-to-point links capable of near linear scaling with CPU, memory and peripheral performance improvements.

One challenge to implementing a computer network which utilizes an channel oriented, switched fabric, serial link architecture is to ensure that the high-speed data communications between a data transmitter (source node) and a data receiver (destination node) operating in two different clocks are synchronous with respect to the transmission and reception of data within each data packet. Such data transmitter and data receiver may correspond to different nodes (end stations such as host computers, servers, and/or I/O devices) of a computer network which operate in synchrony with different clock signals. Failure to maintain synchronization between the data transmitter and data receiver may result in mis-communication (data corruption) and the effective loss of data. Therefore, a data receiver, such as a network interface controller or channel adapter, connected to such a network must transition the data stream from the network clock domain into its own core clock domain.

A block diagram depicting the connection of a network interface controller to receive data from a network communication link is shown in FIG. 1. The serializer/deserializer (SERDES) attached to the network link generates a clock (RXCLK) in conjunction with the link data (RXD). Due to instability in the RXCLK clock signal, it is desirable to reduce the amount of logic in the RXCLK domain. It is also desirable that a host processing system be informed whenever something catastrophic happens on the serial interface. A malfunctioning or disconnected SERDES in the serial interface constitutes a catastrophic event. Therefore, the network interface controller should be capable of detecting these types of events across asynchronous clock domains and informing the host processing system.

BRIEF DESCRIPTION OF THE DRAWINGS

A better understanding and appreciation of the foregoing and of the attendant advantages of the present invention will become apparent from the following detailed description of example embodiments of the invention. While the foregoing and following written and illustrated disclosure focuses on disclosing example embodiments of the invention, it should be clearly understood that the same is by way of illustration and example only and is not to be taken by way of limitation.

FIG. 2 is a schematic representation of a network of NGIO or Infiniband architecture in which the example embodiments of the present invention may be practiced.

FIG. 5 shows possible architecture of a host processing system having an example embodiment of the invention included in a virtual interface expansion bridge thereof.

DETAILED DESCRIPTION

Figure 1:
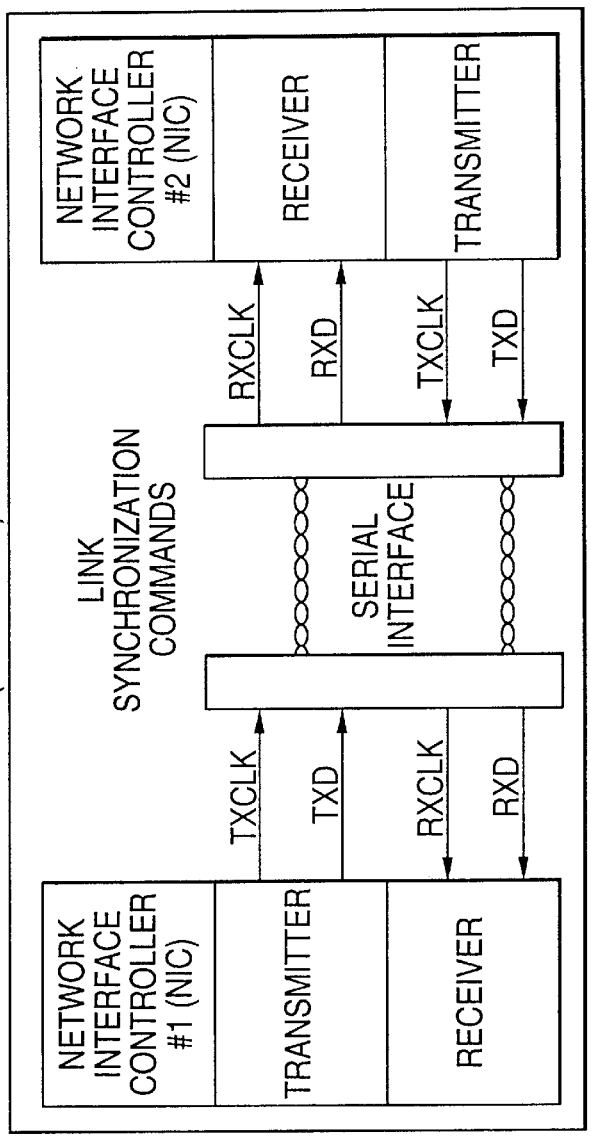
FIG. 1 is a generalized block diagram of a prior art network serial link.

While example embodiments are described herein, the present invention is applicable for use with all types of computer networks, I/O channel adapters and switches, generally including all designs which link together disparate processing systems such as computers, servers, peripherals, storage devices, and devices for data communications. Examples of such computer networks may include a local area network (LAN), a wide area network (WAN), a campus area network (CAN), a metropolitan area network (MAN), a global area network (GAN) and a system area network (SAN), including newly developed computer networks using Next Generation I/O (NGIO), System I/O (SIO), Infiniband or other channel based, switched fabric architecture. LAN networks may include versions of Ethernet, FDDI (Fiber Distributed Date Interface), Token Ring, Asynchronous Transfer Mode (ATM), Fiber Channel and Wireless. For the sake of simplicity, discussions will concentrate mainly on NGIO or Infiniband networks having several nodes (e.g., computers, servers and I/O units) interconnected by corresponding channel adapters to a network fabric having a plurality of links and switches, although the scope of the present invention is not limited thereto. A wide variety of implementations, arrangements and configurations of end stations (e.g., host systems and I/O units), channel adapters, switches and links in all types of data networks may be possible.

According to an example embodiment or implementation, the end stations utilize channel adapters compatible with the NGIO specifications published by the NGIO forum on about Jul. 20, 1999 or version 0.9 of the specifications distributed by the Infiniband Trade Association (www.infinibandta.org). Accordingly, the network consists of a switched fabric (e.g., collection of links, switches and/or switch elements connecting a number of host systems and I/O units), and the endpoint may be a host processing system including one or more host channel adapters (HCAs), or a target system, such as an I/O unit, including one or more target channel adapters (TCAs). Both the host channel adapter (HCA) and the target channel adapter (TCA) may be broadly considered as fabric adapters provided to interface endpoints to the network fabric, and may be implemented in compliance with the NGIO or draft Infiniband specifications for enabling the endpoints (nodes) to communicate to each other over a channel(s).

FIG. 2 schematically represents a data network using NGIO or Infiniband architecture to transmit data over point-to-point links into a device responsible for processing that data according to an embodiment of the present invention. As shown in FIG. 2, the computer network includes a multi-stage switch 200 comprised of a plurality of switches for allowing host systems and target systems to communicate to a large number of other host systems and target systems. Although a single multi-stage switch is shown in FIG. 2, a number of end stations, switches and links, etc., are used to relay data in groups of cells between the end stations and switches via corresponding links and are generally collectively referred to as the network fabric. The nodes shown in FIG. 2 include: a host processing system 230; another network, including, but not limited to, a local area network (LAN), ATM, fibre channel network, and the Internet; an input/output (I/O) device 270; and a remote system 290 such as a computer or server. However, the nodes may include any other processing device or intermediate node.

The network fabric may include a central network manager 210 connected to multi-stage switch 200 and other fabric elements for managing network management functions. However, the central network manager 210 may alternatively be incorporated as part of either the host processing system 230, the second network 250, the I/O device 270, or the remote system 290. In either situation, it may be configured for learning network topology, determining the switch table or forwarding database, detecting and managing faults or link failures in the network and performing other network management functions.

A host channel adapter (HCA) 220 provides an interface between a memory controller (not shown) of the host processing system 230 and multi-stage switch 200 via high speed serial links. Similarly, target channel adapters (TCA) 240 and 260 provide an interface between multi-stage switch 200 and an I/O controller of either a second network 250 or an I/O device 270 via high speed serial links. Another target channel adapter (TCA) 280 may provide an interface between a memory controller (not shown) of the remote system 290 and the multi-stage switch 200 via high speed serial links. Of course, a processing system such as host processing system 230 or remote system 290 may have both a host channel adapter and a target channel adapter. The circuits and methods described below may be provided as part of a host channel adapter 220 to transition data from a host processing system which operates according to a locally generated clock signal or as part of a target channel adapter to transition data from a link into the respective target system which operates in the Receiver Clock domain.

Figure 3:
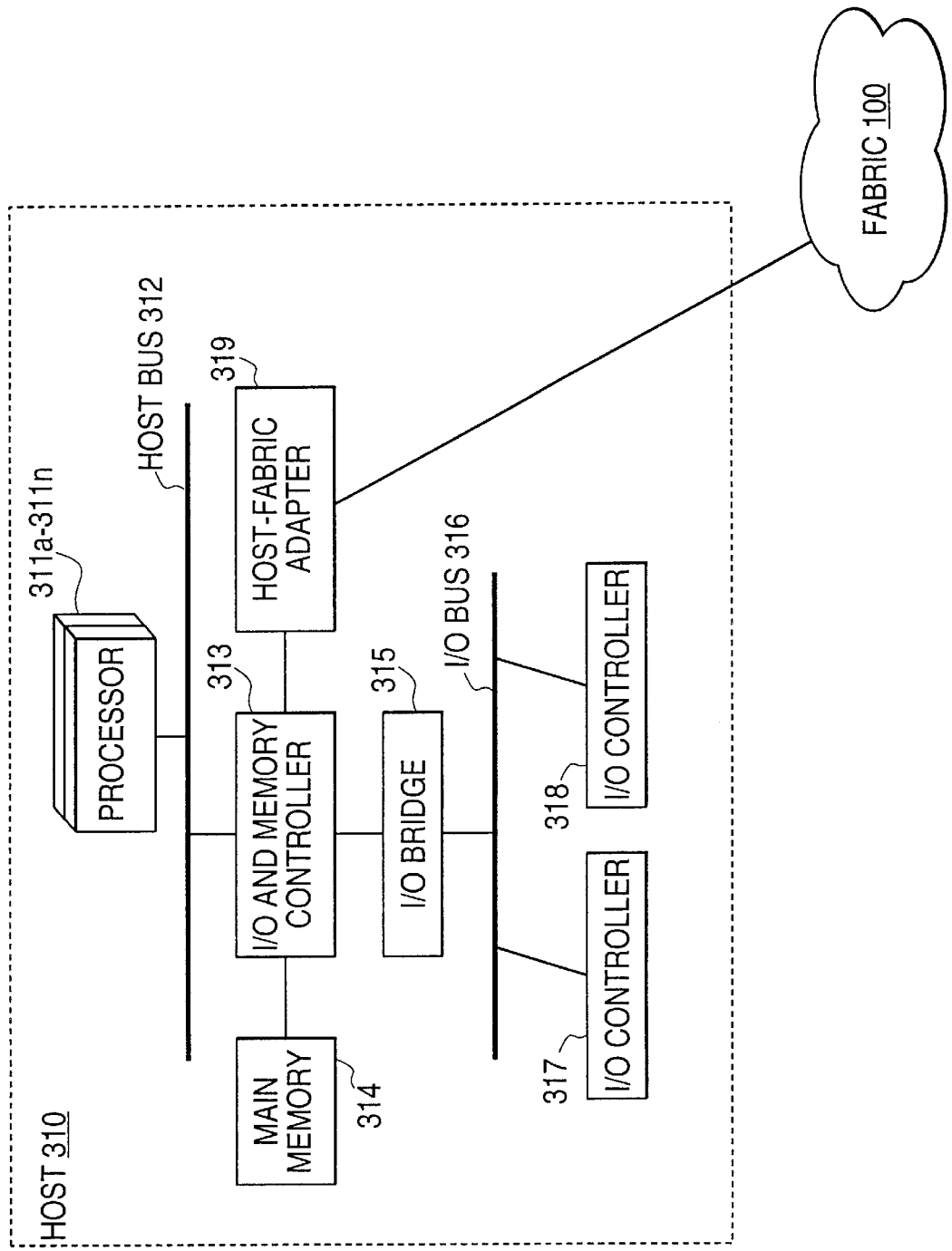
FIG. 3 is a generalized block diagram showing one possible implementation of a host channel adapter according to the invention to connect a host processing system to a network.

An example application of a fabric channel adapter in a host processing system connected to a data network is shown in FIG. 3. Host processing system 310 may be a multi-processor system, including one or more processors 311a–311n coupled to a host bus 312. Each of the multiple processors 311a–311n may operate on a single item (I/O operation), and all of the multiple processors 311a–311n may operate on multiple items (I/O operations) on a list at the same time. An I/O and memory controller interface 313 (or chipset) is connected to the host bus 312. A main memory 314 may be connected to the I/O and memory controller 313. An I/O bridge 315 operates to bridge or interface between the I/O and memory controller 313 and an I/O bus 316. Several I/O controllers may be attached to I/O bus 316, including I/O controllers 317 and 318. I/O controllers 317 and 318 (including any I/O devices connected thereto) may provide bus-based I/O resources.

Figure 4:
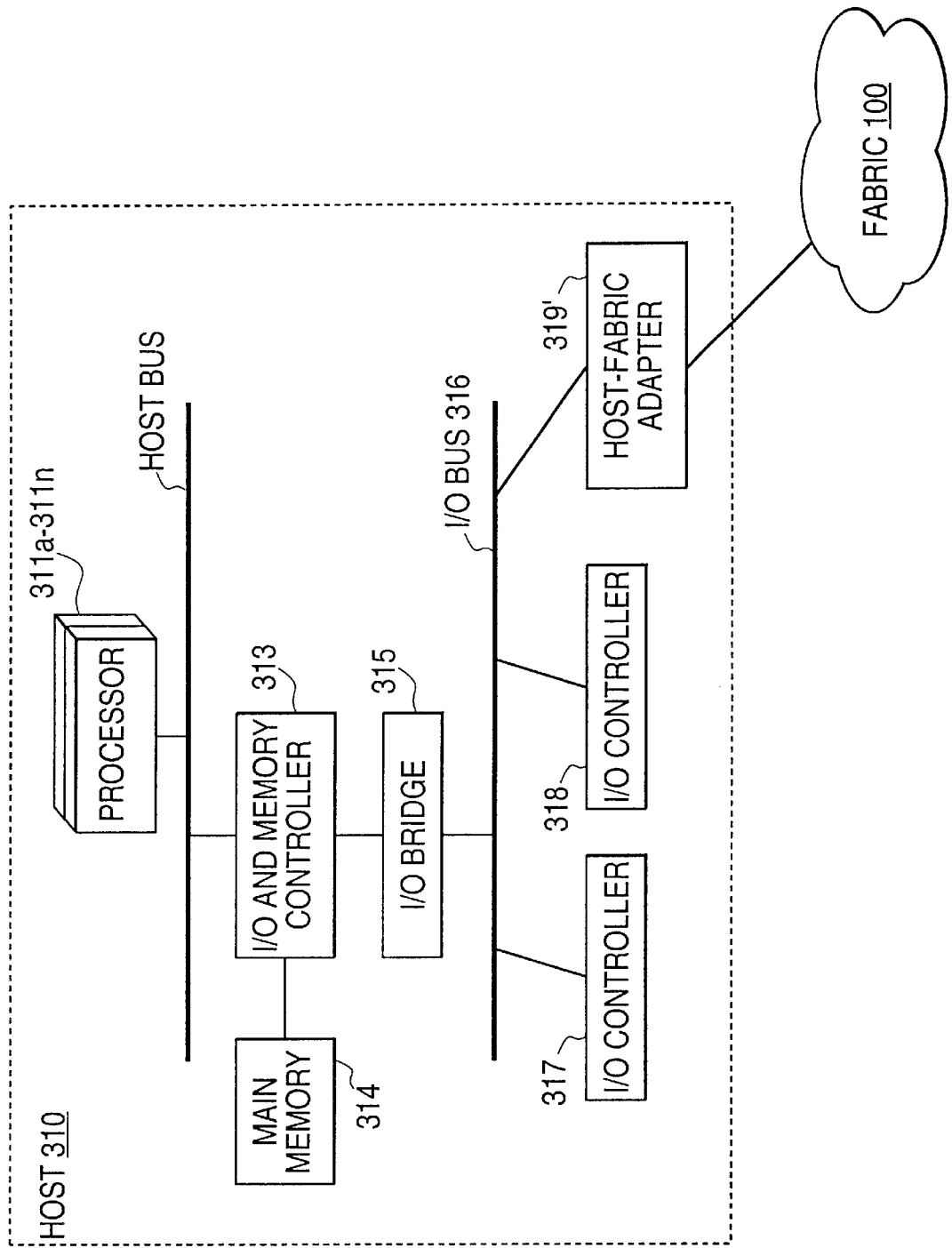
FIG. 4 is a generalized block diagram showing another possible implementation of a host channel adapter according to the invention to connect a processing system to a network.

As shown in FIG. 3, a channel adapter 319 is preferably connected between the I/O and memory controller 313 and the network switching fabric 100. In the event that the I/O and memory controller 313 in any given processing system cannot directly support channel adapter 319, then a channel adapter 319' can be connected to PCI bus via an expansion card as shown in FIG. 4. However, the connection of a channel adapter directly to the I/O and memory controller 313 as shown in FIG. 3 has the advantage of avoiding the afore-mentioned limitations of the I/O bus 316. In either instance, one or more fabric channel adapters may be provided to interface the host system 310 to the network switching fabric 100.

A software stack may be provided in channel adapter 319 or 319' to access the network switching fabric 100 and information about fabric configuration, fabric topology and connection information. The operating system (not shown) of the processing system 310 may include a fabric bus driver and a fabric adapter device-specific driver utilized to establish communication with a remote fabric-attached agent (e.g., I/O controller) of another processing system connected to the network, and perform functions common to most drivers, including, for example, host-fabric adapter initialization and configuration, channel configuration, channel abstraction, resource management, fabric management service and operations, send/receive I/O transaction messages, remote direct memory access (rDMA) transactions (e.g., read and write operations), queue management, memory registration, descriptor management, message flow control, and transient error handling and recovery. Such a software driver module may be written using high-level programming languages such as C, C++ and Visual Basic, and may be provided on a tangible medium, such as a memory device, magnetic disk (fixed, floppy, and removable), other magnetic media such as magnetic tapes; optical media such as CD-ROM disks, or via Internet download, which may be available for a network administrator to conveniently plug-in or download into an existing operating system (OS). Such a software driver module may also be bundled with the existing operating system which may be activated by a particular device driver.

The example embodiments of the invention described in this application are implemented in a hardware device compliant with the Next Generation I/O (NGIO) architecture. The example embodiment and other embodiments of the invention can be implemented in conjunction with other types of switch fabric-based I/O architectures. The example embodiment NGIO uses a similar model for input/output data transfer as is specified by the Virtual Interface (VI) architecture. A highly efficient interface may thus be beneficially used by various computer devices having NGIO hardware connected to a network fabric. However, the example embodiment and other embodiments of the invention may also be used with non-NGIO hardware. However, such an implementation is but one possible application of the example embodiment which may, of course, be applied in any device having a processor and indeed in any server architecture where an improvement in the speed of communications with a network is desired for whatever reason.

Attention now is directed to FIG. 5, an example computer system platform having an example virtual interface expansion bridge incorporated therein according to the principles of the present invention. As shown in FIG. 5, the computer system 500 may comprise a processor subsystem 510 (which may be comprised of a plurality of processors and at least one cache memory 512), a memory controller hub (MCH) 520 connected to the processor subsystem 510 (such as by a host or a processor front side bus), a graphics subsystem 530 (possibly including a AGP 4x graphics controller, a local memory and a display device such as a cathode ray tube, liquid crystal display, or flat panel display) connected to the memory controller hub 520 by a graphics bus 535 (such as an AGP 2.0 bus), and a memory subsystem 540 storing information and instructions for use by the processor subsystem 510 and having at least one memory element 542 connected to MCH 520 by a memory bus 525. The memory element 542 is preferably a dynamic random-access-memory (DRAM), but may be substituted for read-only-memory (ROM), video random-access-memory (VRAM) and the like. The memory element 542 stores information and instructions for use by the host processors 510a–510n.

There may also be a plurality of controller hubs connected to MCH 520 for providing interfaces with various peripheral devices and buses. For example, a 64-bit hub bridge (P64H) 550 for a Peripheral Component Interconnect (PCI) bus may be connected to MCH 520 by a 16 bit hub interface 545, and may operate as an interface between MCH 520 and peripheral PCI bus 585. PCI bus 585 maybe a high performance 32 or 64 bit synchronous bus with automatic configurability and multiplexed address, control and data lines as described in the latest version of "PCI Local Bus Specification, Revision 2.2" set forth by the PCI Special Interest Group (SIG) on Dec. 18, 1998 for add-on arrangements (e.g., expansion cards) with new video, networking, or disk memory storage capabilities.

An I/O Controller Hub 560 may be connected to MCH 520 by a 16 bit hub interface 555, and may operate as an interface between MCH 520 and a plurality of input/output devices and/or buses (not shown). These buses may include, for example, a PCI bus, a Industry Standard Architecture (ISA) or an Expanded Industry Standard Architecture (EISA) bus. The I/O devices may include, for example, a keyboard controller for controlling operations of an alpha-numeric keyboard, a cursor control device such as a mouse, track ball, touch pad, joystick, etc., a mass storage device such as magnetic tapes, hard disk drives (HDD), and floppy disk drives (FDD), and serial and parallel ports to printers, scanners, and display devices.

A Virtual Interface Expansion Bridge (VXB) 570 may be connected to MCH 520 by a 16-bit hub interface 565, and operates as an interface between MCH 520 and network fabric 100. Theremay also be, alternatively or in addition to VXB 570, a PCI Virtual Interface Expansion Bridge (PVXB) 580 connected to a PCI bus, such as PCI bus 585, and which operates as an interface between the PCI bus and network fabric 100. PVXB 580 may, but need not be, substantially similar to VXB 570. In an example embodiment, PVXB 580 and VXB 570 each utilize a silicon chip of a design having at least two different output stages, alternatively supporting either a PCI connection or a hub interface, so that any individual silicon chip can be utilized as either a PVXB or VXB by selectively connecting one of the output stages to the external leads of the silicon chip during the later steps of producing the silicon chip. Although only VXB 570 is mentioned hereafter in this detailed description, it should be understood that the description thereof is equally applicable to PVXB 580.

As a non-limiting example, MCH 520, PCI 64 Hub 550 and I/O Controller Hub 560 of computer system 500 may comprise an Intel® 840 chipset or similar Intel® chipset. Of course, computer system 500 may utilize different I/O or memory controllers, may be configured differently, or employ some additional or different components than those shown in FIG. 5. In particular, a VXB may be easily added to any computer system having a PCI bus by installation of a PVXB add-on card.

VXB 570 includes an NGIO or Infiniband compliant host channel adapter as well as other circuitry to transition data from the host channel adapter to MCH 520. Specifically, VXB 570 receives data from the network serial link in byte granularity and converts it into naturally aligned quad-words (64 bits) suitable for transfer on the host bus. The data may be control or payload. In general, the payload data is destined to main memory. VXB 570 also aligns the byte oriented payload data from the network link into naturally aligned quad-words ready for transmission on the host bus.

Other circuitry in VXB 570 includes the VI architecture developed as an improvement over TCP/IP communication protocols in certain network environments. The Transmission Control Protocol (TCP) is a sliding window flow control protocol that uses sequence numbers, acknowledgments, error detection, retransmission of lost packets, etc., where the underlying network environment is presumed to be inherently unreliable. However, the centralized in-kernel protocol processing in TCP/IP networks prohibits applications from realizing the potential raw hardware performance offered by underlying high-speed networks. In contrast, the Virtual Interface (VI) Architecture enables distributed applications to perform low overhead communication over high-bandwidth, low-latency networks interconnecting nodes within a distributed computer system. VI is described in the Virtual Interface Architecture Specification, Version 1.0, Dec. 16, 1997, jointly authored by Intel Corporation, Microsoft Corporation, and Compaq Computer Corporation, and makes it possible to perform low overhead communication using off-the shelf SAN hardware.

While providing high reliability, the VI architecture does not perform other transport level functions, including flow control, buffer management, segmentation and reassembly, and link synchronization. Signaling protocols for the links in the example embodiments thus contain code groups to signal the beginning and end of a cell and the gap between cells, and code groups controlling the flow of cells across the link. For example, Start of Cell Delimiter (SCD) and End of Cell Delimiter (ECD) characters, inter-cell flow control sequences (comma character and associated flow control character) and IDLE characters may be taken into account to determine the maximum defined period between IDLE characters. Specifically, the IDLE characters are available in two distinct IDLE sequences: IDLE-1 and IDLE-2. IDLE characters may be transmitted on the link either during link synchronization periods or inter-cell gap periods (IDLE periods which must occur between transmitted cells).

Figure 6:
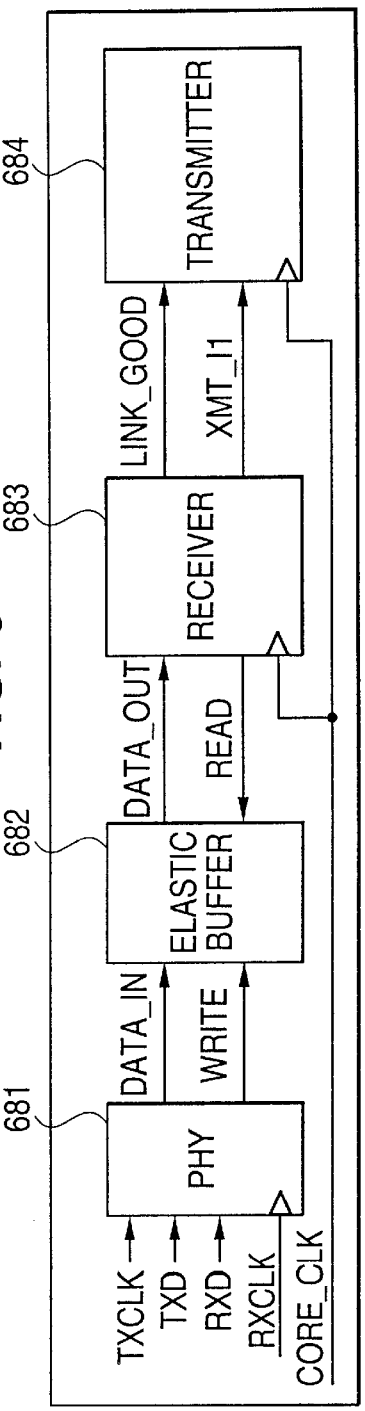
FIG. 6 is a block diagram of the basic logical elements of an example embodiment of a data receiver according to the present invention.

Turning now to FIG. 6, a generalized block diagram is provided of an example data receiver in VXB 570 synchronizing data received from a link in the RXCLK domain into the core clock domain. Once in the core clock domain, other circuitry (not shown) in VXB 570 forwards the data to MCH 520.

Under normal operation, received link data is transferred from PHY block 681 (operating in the RXCLK domain) to receiver block 683 (operating in the core clock domain) by means of elastic buffer 682. Elastic buffer 682 is required due to the asynchronous nature of the two clock domains. It is used to pass data and, during link synchronization, pass link synchronization commands to transmitter block 684 without asynchronous sideband signals. The data receiver may be implemented as a block of logic (e.g., hardware, software and firmware) residing in VXB 570 between the network link and the other circuitry responsible for transferring the data to MCH 520. Data synchronization between these elements must be established, otherwise miscommunication (data corruption) and effective loss of data may occur.

For example, if the RXCLK happens to be faster than the core clock, then the link data arrives faster than the data receiver may process the link data. Consequently, link data may overflow and be lost at VXB 570. Likewise, if the core clock happens to be faster than the RXCLK, there may be times when there may be no receiver data to process due to the respective clock differences. Consequently, link data may underflow and the same data may be processed twice since the core clock is faster. In either situation, the data transferred from VXB 570 may not correspond to the data actually transmitted on the link. The architecture and functioning of elastic buffer 682 is discussed in detail in the application entitled "Elastic Buffer" by Dean S. Susnow filed on Nov. 1, 1999 and assigned U.S. patent application Ser. No. 09/432,050.

PHY block 681 consists of the logic associated with the receive function of the corresponding port. This logic block operates solely in the Link Clock domain. The Link Clock domain is defined by the utilization of the SERDES generated RXCLK as the clock for all sequential elements residing within that domain.

Figure 7:
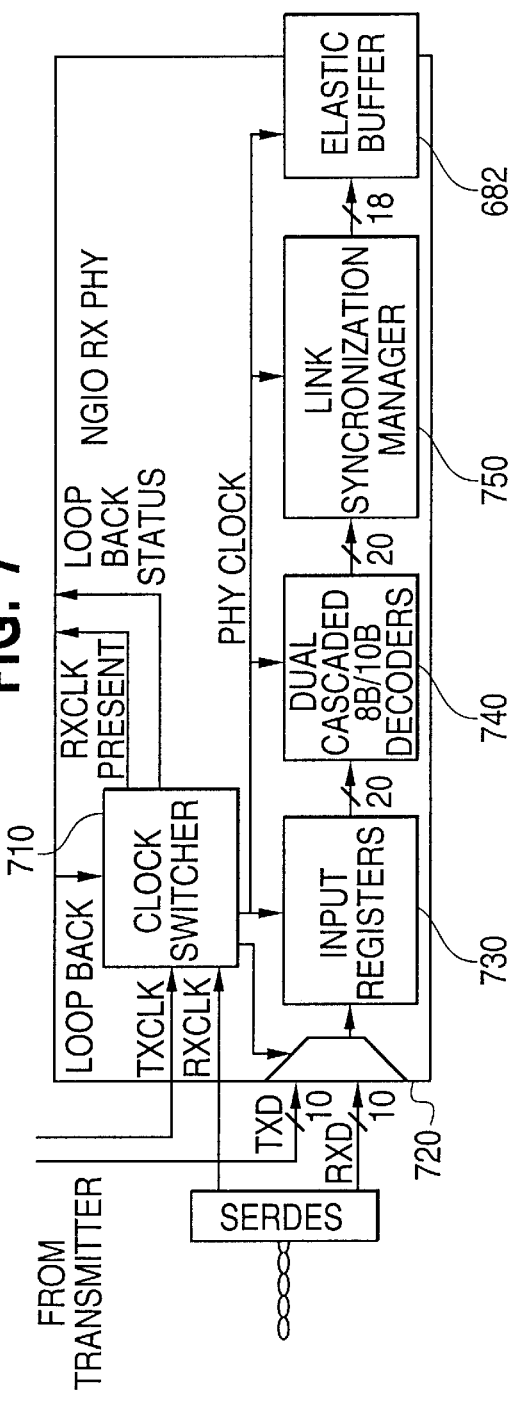
FIG. 7 is a block diagram of the elements in PHY block 681 of the example embodiment in FIG. 6.

As shown in FIG. 7, PHY block 681 in VXB 570 includes the pipelined logic of Input Registers 730, 8B/10B Decoders 740, and Link Synchronization Manager 750 (connected to Elastic Buffer 682) functioning in the receive clock (RXCLK) domain. The primary function of PHY block 681 is to retrieve data from the respective network link in adherence with the network protocol and reliably transfer the associated data into the core clock domain. The Input Registers 730 transition the double pumped receive data stream from the SERDES or NGIO or Infiniband compliant device into a single pumped internal data stream. The 8B/10B Decoders 740 verify the integrity of the internal receive data stream. The Link Synchronization Manager 750 facilitates link synchronization when necessary and constantly monitors link health. The Elastic Buffer 682 provides the means of transitioning the receive data stream from the RXCLK domain into the core clock domain.

PHY block 681 accepts the receive data stream from the RXD output of the corresponding SERDES or NGIO or Infiniband compliant device. The protocol of this interface dictates that valid data (RXD) is accepted in conjunction with both edges of the RXCLK. Essentially, the receive data stream from the remote device or SERDES is double pumped. The Input Registers 730 consists of 2 banks of 10-bit input registers. One bank is clocked off the rising edge of RXCLK while the other bank is clocked off the falling edge of RXCLK. This translates the 10-bit double pumped data stream into a 20-bit single pumped data stream in order to minimize the clocking requirements of the downstream PHY logic.

The $2^{nd}$ stage of PHY block 681 is the 8B/10B Decoders Unit 740. It is comprised of a pair of standard 8B/10B decoders connected in a cascaded configuration. Each decoder translates the 10-bit encoded data into an 8-bit data byte, a control bit and an associated error bit. The control bit specifies if the character is of data or control type. The error bit indicates the validity of the corresponding received data character. Thus the 20-bit raw data input is transformed into two 8-bit data bytes and 4 control signals for a total of 20 bits. These outputs are registered comprising the $2^{nd}$ stage of the PHY block 681.

The $3^{rd}$ stage of PHY block 681 is Link Synchronization Manager 750. This block is responsible for determining the current health of the link by interrogating the receive data stream. In addition, this unit facilitates link synchronization by writing link establishment commands directed to the corresponding port's transmitter into Elastic Buffer 682 when necessary. These commands are interpreted by the receiver functioning in the core clock domain of VXB 570 and passed to the transmitter as synchronous control signals. Link Synchronization Manager 750 prohibits IDLE-1 and IDLE-2 character sequences from being written into Elastic Buffer 682 to account for the slight differences in frequencies of the two clock domains. The error output signals generated from the 8B/10B decoders 740 are replaced by defined 9-bit error codes that are interpreted by the receiver block 683. Link Synchronization Manger 750 includes circuitry to detect misaligned Start-of-Cell Delimiters, invalid inter-cell gap sequences and various link level errors and control the write input to Elastic Buffer 682 dictating which characters in the receive data stream are permitted into the receiver for further processing. The 20-bit output of the 8B/10B Decoder block 740 is translated into two 9-bit quantities for a total of 18-bits. The 9-bit quantities consist of an 8-bit data byte and an associated control bit specifying whether the data byte is a data type or control type.

Elastic Buffer 682 enables the receive data stream in the RXCLK domain to be transferred into the core clock domain. It can potentially accept two characters every RXCLK. However, receiver 683 reads elastic buffer 682 one character at a time at twice the frequency.

At any given time, the PHY block 681 may be in either of 2 modes of operation. These modes of operation define the data path and associated clock utilized within PHY block 681. In normal mode of operation, PHY block 681 utilizes the RXCLK clock and RXD (receive data) signals generated from the SERDES as the system clock and respective data source. This path is enabled to allow the corresponding port communication with a remote device on the network link. In loop-back mode of operation, the PHY block 681 utilizes the TXCLK and TXD (internally generated transmit clock & data) from transmitter block 684 as the system clock and respective data source. This data path enables the corresponding port to function without the need for an external SERDES or remote device attached to the corresponding link. The loop-back function is primarily diagnostic. It essentially enables the receive data to be generated from the transmit data path and looped back to the receive data path to ensure port health and provide associated diagnostic capabilities. All the logic residing in PHY block 681 is capable of functioning in either of the 2 asynchronous clock domains (link or transmit). PHY block 681 in VXB 570 includes a clock switcher 710 to dynamically switch between these two domains as the system clock to all PHY level logic.

Figure 8:
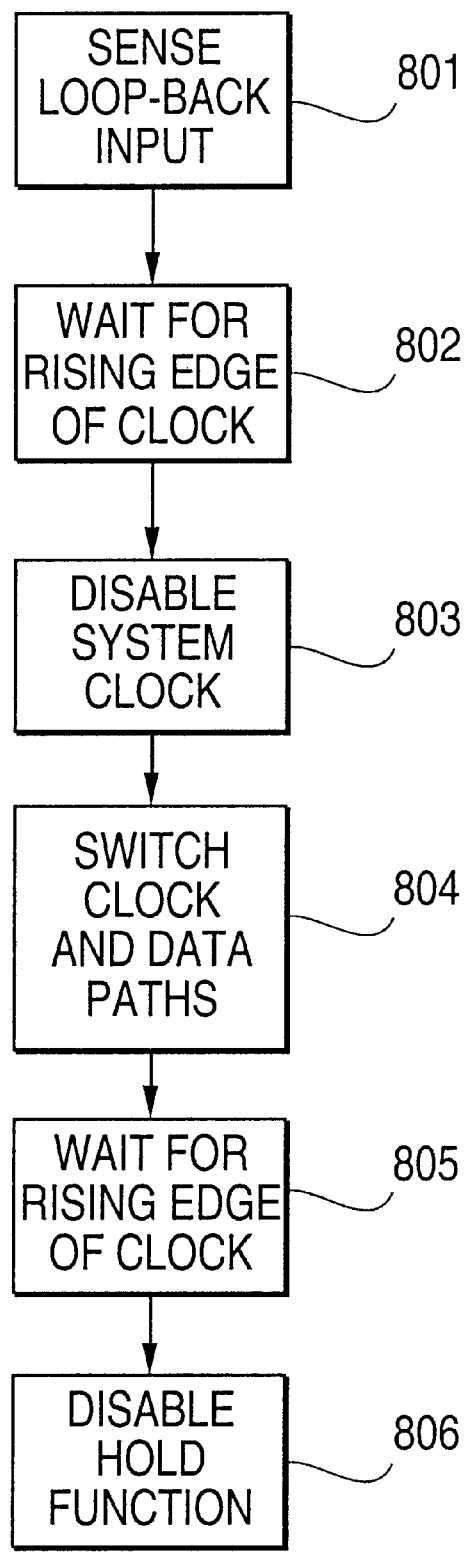
FIG. 8 is a flowchart illustrating the operation of Clock Switcher 710 in the example embodiment in FIG. 7.

The "Loop-back" input to Clock Switcher 710 determines the utilized clock and data path within PHY block 681. When "Loopback"=1, transmitter block 684 provides the clock and data inputs to PHY block 681. When "Loopback"=0, the attached SERDES provides the clock and data inputs to PHY block 681. The function of Clock Switcher 710 is to switch the source clock of PHY block 681 without introducing glitches in the clock path during the switch. This is essential because glitches in the clock path will inevitably cause the PHY level logic to malfunction during the switch. To alleviate this, Clock Switcher 710 operates with the algorithm shown in FIG. 8. At step 801, the state of the "Loop-back" input is sensed, in the current system domain, to determine if a switch is required. Wait for the rising edge of the current system clock (step 802). Disable the current system clock by holding it in the active high state (step 803). Switch the associated clock and data multiplexers (step 804). Wait for the rising edge of the new system clock (step 805) and enable the new clock to function as the system clock of PHY block 681 by disabling the hold function (step 806).

This algorithm utilized by Clock Switcher 710 mandates that both clocks (link and transmit) be fully functional to perform the switch correctly. If either clock is absent, Clock Switcher 710 will disable the clock to PHY block 681 until its presence is detected. However, the link clock provided by the external SERDES is volatile because it is recovered from the received data path and depends on the remote device on the serial link and the link itself. If the remote device is malfunctioning, then the presence of the link clock is not guaranteed. (The transmit clock is internally generated in transmit block 684 of VXB 570 is presumed to always be present and valid.)

There are two problems raised by the possible absence of a link clock. The first occurs when the link clock is absent when clock switcher 710 is required to switch clock/data path sources. The second problem occurs when the system is to be reset and the PHY block 681 is currently operating in the link clock domain and thus ignores the reset.

The example embodiment solves the second problem by resetting PHY block 681 in the transmit clock domain. If the source of the system reset is asynchronous to the transmit clock, then a standard synchronizer is implemented to generate a synchronous reset to all of the elements in PHY block 681. Clock Switcher 710 is modified to sense the state of system reset and switch the clock source on the fly. Clock Switcher 710 does not guarantee that switch occurring reset is glitch free. However, if the duration of reset is sufficient, any glitches caused by transitioning the clock source to PHY block 681 can be tolerated and the associated reset can be certain to be deterministic. During reset, the clock and associated data path utilized in PHY block 681 are sourced from transmitter block 684.

Clock Switcher 710 also incorporates SERDES detection logic which dynamically detects the presence or loss of the associated RXCLK signal in the stable transmit clock domain in order to make the determination as to the existence of an external SERDES. Most of the time, the remote device is connected via a SERDES. The SERDES detection logic, such as that shown in FIG. 9, will determine the presence of the SERDES subsequent to reset. If present, the clock source to PHY block 681 will be switched from the transmit clock to the link clock. Until the SERDES is detected, the clock source at PHY block 681 remains the transmit clock. This prohibits PHY block 681 from ever being switched to a non-existent clock source.

A programmable register (not shown) controls the "Loop-back" signal. Control of the clock and associated data path is ultimately granted to software of VXB 570, which may in turn be controlled by the operating system software of host processing system 310. However, PHY block 681 will not allow the controlling software to switch to a domain with a non-existent clock. If the Loop-back register is programmed to enable this function, PHY block 681 initially examines the status of the SERDES detect logic to determine if a valid clock source exists. If so, the clock and data domain switching occurs. If not, the switching function is prohibited from occurring. PHY 681 provides 2 status bits back to the controlling software regarding the status of PHY block 681. A "RXCLK Present" signal indicates that PHY block 681 believes that an external SERDES is currently connected to the port. The Loop-back status indicates to the controlling software whether PHY block 681 is currently enabled for Loop-back mode of operation. The controlling software queries the "RXCLK Present" signal to determine the existence of the external SERDES. If present, it programs the Loop-back signal to change the clock and data domains of PHY block 681 and then queries the Loop-back status bit to determine if the requested domain change was successful.

As mentioned above, SERDES recovers the RXCLK from the received data stream and generates that clock to the attached port. A disconnected or malfunctioning SERDES will not generate the corresponding RXCLK. In order to detect a malfunctioning SERDES, a circuit must be capable of detecting the absence of the RXCLK signal. Unfortunately, the clock the SERDES generates is asynchronous to the core clock of the associated port in VXB 570.

Figure 9:
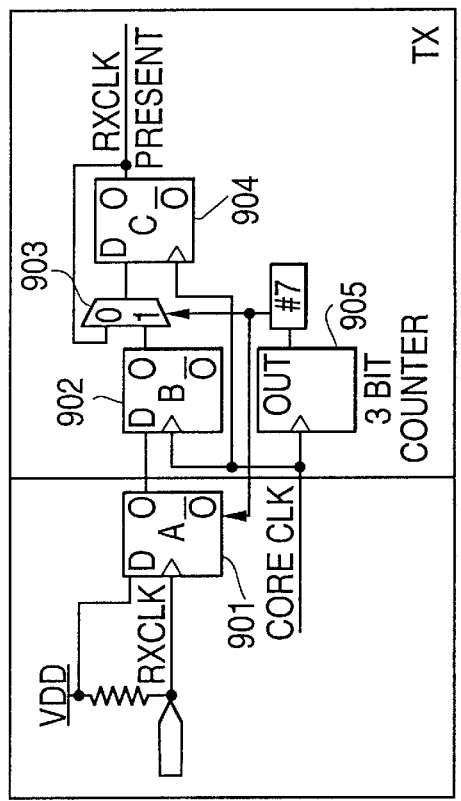
FIG. 9 is a block diagram of a SERDES detect logic circuit in an example embodiment of the invention.

The example circuit shown in FIG. 9 detects a malfunctioning or disconnected SERDES. It detects the presence of the SERDES generated RXCLK in the receive clock domain. It then synchronizes the corresponding presence detect signal into the core clock domain and informs VXB 570 if the signal ever indicates the RXCLK is absent.

The I/O buffer on VXB 570 contains a weak pull-up resistor in case the RXCLK pin is unconnected. Flip-flop 901 detects the presence of RXCLK in the corresponding clock domain. The D-input of flip-flop 901 is tied to logic "1". Flip-flop 901 is asynchronously cleared periodically by a signal generated in the core clock domain. The subsequent rising edge of RXCLK after flip-flop 901 is cleared will cause it to transition to logic "1".

Flip-flop 902 constitutes the $1^{st}$ stage of a synchronizer. It is responsible for sampling the presence of detection flip-flop 901 in the core clock domain and not allowing a metastable event to propagate. Flip-flop 904 constitutes the $2^{nd}$ stage of the synchronizer. Flip-flop 904 is only enabled to change state every 8-core clock cycles. Multiplexer 903 preceding flip-flop 904 performs this function. Counter 905 is free running in the core clock domain. Whenever the current count value is equal to 7, flip-flop 904 is enabled to change state in conjunction flip-flop 901 is cleared and the whole process begins again. The circuit thus becomes a digital filter that detects at least one transition of RXCLK per 8 core clock cycles. The RXCLK Present output signal of FIG. 9 indicates the presence of the RXCLK in the core clock domain. If at any time, this signal is driven to logic "0", an event is generated to VXB 570 indicating a catastrophic occurrence in the serial interface. In addition, the output feeds a bit in an internal register to provide VXB 570 with link status information.

Although an example embodiment, the invention is not limited to the example embodiment described above. Indeed, an advantage of the invention is that it may be particularly useful and widely adaptable to many network devices. In this way, data transfers can be made efficient by network interface controllers as discussed in the example embodiment.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. A network interface controller to receive data from a network fabric through a serial link, the data on the link to be clocked in a link clock domain different than a core clock domain of said network interface controller, comprising:

a physical interface, to operate in the link clock domain and having a pipeline architecture partitioned into the following sequence of logic blocks:
an input register block to receive the link clock and the data on the link, and to transfer the data in the link clock domain,
a decoder block having dual cascaded 8B/10B decoders to receive and to decode the data transferred by the input register block; and
a link synchronization manager to manage the synchronization of the serial link according to the decoded data; and an elastic buffer connected to an output of the link synchronization manager and to receive the link clock and configured to output the decoded data in the core clock domain.

2. The network interface controller recited in claim 1, wherein the network interface controller supports the NGIO or draft Infiniband specifications.

3. The network interface controller recited in claim 2, wherein the network interface controller includes circuitry to convert the data and output it directly to a host interface.

4. The network interface controller recited in claim 3, wherein the data on the link is double pumped and the input registers transition the double pumped link data stream into a single pumped internal data stream.

5. The network interface controller recited in claim 4, wherein the 8B/10B decoders verify the integrity of the internal data stream.

6. The network interface controller recited in claim 5, wherein the link synchronization manager facilitates link synchronization and constantly monitors link status.

7. A network interface controller to receive data from a network fabric through a serial link, the data on the link to be received and clocked in a link clock domain different than a transmit cock domain of a transmitter in said network interface controller, the network interface controller comprising:

a multiplexer to receive data from the serial link and data transmitted from said transmitter; and a clock switcher to receive a receive clock signal in the link clock domain and a transmit clock signal in the transmit clock domain, to select one of said link clock signal and said transmit clock signal, and to provide said selected clock signal to logical blocks in a receiver portion of said network interface controller.

8. The network interface controller recited in claim 7, wherein the clock switcher is to provide a multiplexer select signal to cause said multiplexer to select one of said data from serial link and said data transmitted from said transmitter.

9. The network interface controller recited in claim 8, wherein the clock switcher is to receive a loop-back signal to determine the selected clock signal and data path.

10. The network interface controller recited in claim 9, wherein said loop-back signal is to be controlled by execution of software code.

11. The network interface controller recited in claim 9, wherein, before a clock is switched by said clock switcher, the status of SERDES detect logic is to be examined to determine whether there is a valid clock source.

12. The network interface controller recited in claim 11, wherein a signal is to be provided to indicate whether or not an external SERDES is currently connected.

13. The network interface controller recited in claim 12, wherein a Loop-back status signal is to indicate whether or not a Loop-back mode of operation is enabled.

14. A SERDES detection logic in a first clock domain to indicate whether or not a clock signal is present for a network link, said network link having a link clock domain different than said first clock domain, comprising:

a first logic circuit in the link clock domain to detect the presence of the link clock and to generate a presence detect signal in the link clock domain; and a second logic circuit to synchronize the presence detect signal into the first clock domain.

15. The SERDES detection logic recited in claim 14, further comprising a third logic circuit to provide a positive signal if the link clock is ever detected to be present during a time period of a plurality of clock cycles in the first clock domain.

16. The SERDES detection logic recited in claim 14, wherein the first logic circuit comprises a flip-flop whose data input is to be biased to one and which is to be clocked by the link clock and cleared by the clock in the first clock domain.

* * * * *

UNITED STATES PATENT AND TRADEMARK OFFICE
CERTIFICATE OF CORRECTION

PATENT NO.    : 6,747,997 B1
DATED         : June 8, 2004
INVENTOR(S)   : Dean S. Susnow et al.

It is certified that error appears in the above-identified patent and that said Letters Patent is hereby corrected as shown below:

<u>Column 12,</u>
Line 2, change "transmit cock domain" to -- transmit clock domain --.

Signed and Sealed this

Twentieth Day of September, 2005

JON W. DUDAS
*Director of the United States Patent and Trademark Office*